United States Patent
Afghahi et al.

(10) Patent No.: US 6,232,826 B1
(45) Date of Patent: *May 15, 2001

(54) CHARGE PUMP AVOIDING GAIN DEGRADATION DUE TO THE BODY EFFECT

(75) Inventors: Morteza C. Afghahi, Tempe; Yueming He, Chandler, both of AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,560

(22) Filed: Jan. 12, 1998

(51) Int. Cl.[7] ............................................. G05F 3/02
(52) U.S. Cl. .............................. 327/536; 307/110; 363/60
(58) Field of Search ..................................... 327/535, 536, 327/537, 589; 326/88; 365/189.09; 307/110; 363/59, 60

(56) References Cited

U.S. PATENT DOCUMENTS

| | | | | |
|---|---|---|---|---|
| 4,488,060 | * | 12/1984 | Simko | 327/170 |
| 4,701,637 | * | 10/1987 | Piro | 327/537 |
| 4,710,647 | * | 12/1987 | Young | 327/536 |
| 5,059,815 | * | 10/1991 | Bill et al. | 327/536 |
| 5,081,371 | * | 1/1992 | Wong | 327/536 |
| 5,301,097 | * | 4/1994 | McDaniel | 307/110 |
| 5,352,936 | * | 10/1994 | Allen | 327/530 |
| 5,386,151 | * | 1/1995 | Folmsbee | 327/536 |
| 5,399,928 | * | 3/1995 | Lin et al. | 327/434 |
| 5,424,659 | * | 6/1995 | Stephens | 326/81 |
| 5,543,734 | * | 8/1996 | Volk et al. | 326/83 |
| 5,576,635 | * | 11/1996 | Partovi et al. | 327/534 |
| 5,703,511 | * | 12/1997 | Okamoto | 327/536 |
| 5,726,941 | * | 3/1998 | Tobita | 365/203 |
| 5,754,476 | * | 5/1998 | Caser et al. | 327/536 |
| 5,767,735 | * | 6/1998 | Javanifard et al. | 327/536 |
| 5,774,399 | * | 6/1998 | Kwon | 365/185.18 |
| 5,815,446 | * | 9/1998 | Tobita | 327/534 |
| 5,864,243 | * | 1/1999 | Chen et al. | 326/81 |
| 5,886,566 | * | 3/1999 | Park et al. | 327/536 |
| 5,892,267 | * | 4/1999 | Takada | 327/537 |
| 5,986,947 | * | 11/1999 | Choi et al. | 327/390 |
| 6,023,188 | * | 11/1999 | Lee et al. | 327/536 |

OTHER PUBLICATIONS

Bueau of Naval Personal, "Capacitance", Basic Electricity, 2nd Revised/Edition, pp. 188–190, 1970.*

* cited by examiner

*Primary Examiner*—Timothy P. Callahan
*Assistant Examiner*—Terry L. Englund
(74) *Attorney, Agent, or Firm*—Blakely, Sokoloff, Taylor & Zafman LLP

(57) ABSTRACT

A Charge Pump Avoiding Gain Degradation Due to the Body Effect. A charge pump having a first input and a first output, a stage of the charge pump including a first capacitor having a first node and a second node, the second node coupled to receive a first signal; a first p-type transistor having a first gate, a first source, and a first drain, the first gate being coupled to the first node and the first drain, the first source being coupled to the first input; a second capacitor having a third node and a fourth node, the fourth node coupled to receive a second signal; and a second p-type transistor having a second gate, a second source, and a second drain, the second gate being coupled to the third node and the second drain, the second source being coupled to the first drain, the second drain being coupled to the first output.

7 Claims, 2 Drawing Sheets

CHARGE PUMP AVOIDING GAIN DEGRADATION DUE TO THE BODY EFFECT

BACKGROUND OF THE INVENTION

1. Field of the Invention

The present invention relates to the field of integrated circuits; more particularly, the present invention relates to a charge pump.

2. Description of Related Art

Power consumption in integrated circuits is generally reduced as the power supply voltage is reduced. Reducing power consumption is particularly important for portable devices since they generally are powered by batteries.

However, some circuitry in an integrated circuit may require a higher power supply voltage than the rest of the integrated circuit. For example, flash memories typically require a higher voltage to perform program operations to memory cells. A charge pump is generally used to receive a low voltage power supply and generate a higher voltage power supply for the high voltage circuitry.

A Dickson charge pump is a well-known charge pump configuration that employs n-type transistors coupled in series. The input of the series is the low voltage power supply and the output of the series is the high voltage power supply. The voltage gain of each stage of the series (efficiency) is related to the increase in the gate voltage (due to the charge pumped into the gate node) less the $V_T$ voltage drop to the output (source) node of that stage.

As the low voltage power supply is reduced, the efficiency of the Dickson charge pump is severely degraded. As the voltage of the low voltage power supply is reduced, the voltage fluctuation at the pumping nodes is reduced thereby reducing the amount of charge pumped into the gate node for given pumping capacitors. This reduces the increase in gate voltage for each stage. In addition, the $V_T$ voltage drop becomes more significant relative to the reduced increase in gate voltage for low voltage power supply voltages that approach the $V_T$ voltage drop. Thus, more of the increase in gate voltage is lost to the $V_T$ voltage drop to the output node as the voltage of the low voltage power supply is reduced.

The body effect causes the $V_T$ of an n-type transistor to increase as the source to substrate voltage increases. Since the substrate voltage is typically coupled to ground for an n-type transistor and the source voltage of each subsequent stage of the series is increasing (being pumped higher than the previous stage), the $V_T$ of each stage of the charge pump is higher than the previous stage. Thus, each additional stage of the Dickson charge pump increments the output voltage by less than the previous stage due to the body effect. Eventually, the increase in the output voltage for an additional stage is so small or non-existent that it is impractical or ineffective to add additional stages. Thus, the efficiency and scalability of the Dickson charge pump is limited.

Circuitry that tends to compensate for the body effect has been developed. However, this circuitry employs many additional transistors thereby increasing the cost of the implementation.

Therefore it is desirable to have a charge pump for a low voltage power supply that is more efficient than the Dickson charge pump. Furthermore, it is desirable to provide a charge pump for a low voltage power supply that can be scaled more effectively than the Dickson charge pump.

SUMMARY OF THE INVENTION

An apparatus has a first input and a first output, a circuit including a first capacitor having a first node and a second node coupled to receive a first signal; a first p-type transistor having a first gate, a first source, and a first drain, the first gate being coupled to the first node and the first drain, the first source being coupled to the first input; a second capacitor having a third node and a fourth node coupled to receive a second signal; and a second p-type transistor having a second gate, a second source, and a second drain, the second gate being coupled to the third node and the second drain, the second source being coupled to the first drain, the second drain being coupled to the first output.

DETAILED DESCRIPTION

The charge pump of the present invention for a low voltage power supply that is more efficient than a Dickson charge pump known in the art. Furthermore, the charge pump of the present invention provides a low voltage power supply that can be scaled more effectively than the Dickson charge pump.

In the following detailed description, numerous specific details are set forth in order to provide a thorough understanding of the described invention. Some of these specific details need not be used to practice the invention. In other instances, well-known structures, signals, and methods have not been shown in detail in order not to obscure the described invention.

Figure 1:
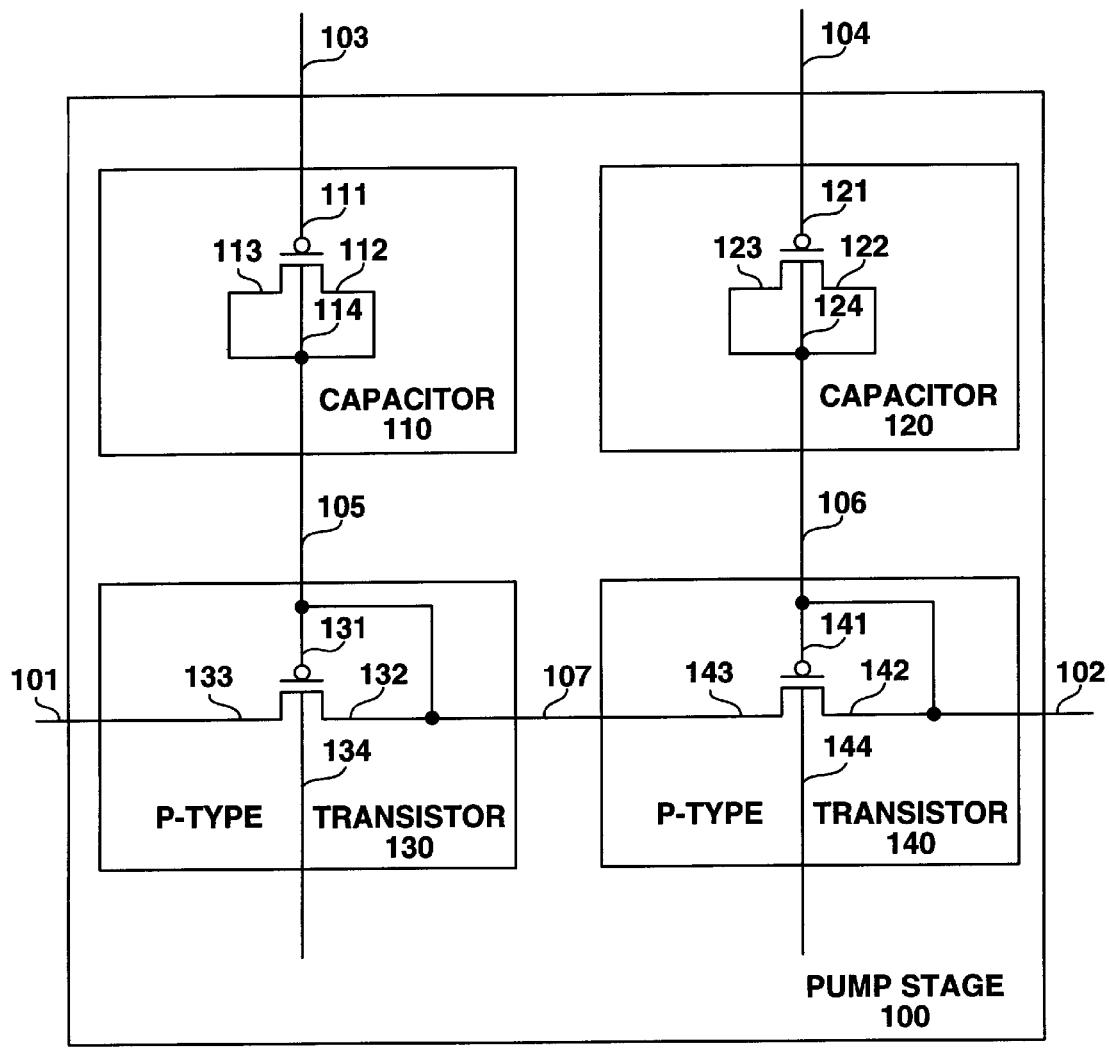
FIG. 1 illustrates one embodiment of a pump stage 100 of the present invention.

FIG. 1 illustrates one embodiment of a pump stage 100 of the present invention.

The pump stage 100 includes a capacitor 110, a transistor 130, a capacitor 120, and a transistor 140.

The capacitor 110 has a node 103 and a node 105. The node 103 is coupled to receive a first phase signal. When the first phase signal is asserted on node 103, charge is pumped across the capacitor 110 to node 105. The p-type transistor 130 has a gate 131, a drain 132, a source 133, and an n-well 134. The gate 131 is coupled to the drain 132, the node 105, and the node 107. The n-well 134 is floated. The source 133 is coupled to the node 101 to receive an input voltage. When charge is pumped onto node 105, the voltage of the node 107 is increased.

The increase in the voltage of node 107 relative to the voltage of node 101 may be approximated as:

$$\Delta V = V_C \frac{C_P}{C_P + C} - \frac{I_O}{f(C_P + C)} - V_{TP}$$

where $V_C$ is the amplitude of the first phase signal, $C_P$ is the charge pumping capacitance (the capacitor 1110), C is the parasitic capacitance associated with the node 107, f is the frequency of the first phase signal, $I_O$ is the current related to the pumped charge, $V_{TP}$ is the threshold voltage of the p-transistor 130.

The capacitor 120 has a node 104 and a node 106. The node 104 is coupled to receive a second phase signal. When the second phase signal is asserted on node 104, charge is pumped across the capacitor 120 to node 106. The p-type transistor 140 has a gate 141, a drain 142, a source 143, and an n-well 144. The n-well 144 is floated. The gate 141 is coupled to the drain 142, the node 106, and the node 102. The source 143 is coupled to the node 107. When charge is pumped onto node 106, the voltage of the node 102 is increased.

The increase in the voltage of node 102 relative to the voltage of node 107 may be approximated as:

$$\Delta V = V_C \frac{C_P}{C_P + C} - \frac{I_O}{f(C_P + C)} - V_{TP}$$

where $V_C$ is the amplitude of the second phase signal, $C_P$ is the charge pumping capacitance (the capacitor 120), C is the parasitic capacitance associated with the node 102, f is the frequency of the second phase signal, $I_O$ is the current related to the pumped charge, $V_{TP}$ is the threshold voltage of the p-transistor 140.

Unlike the Dickson charge pump of the prior art, the voltage gain of each additional pumping element is not degraded by the body effect. The gain of each additional pumping element is approximately the same as the prior element. Thus, the increase in the voltage of node 102 relative to the voltage of node 101 is the sum of equations 1 and 2.

The use of transistors to implement the capacitor 110 and the capacitor 120 is generally more efficient in terms of silicon area used than other capacitor structures. However, transistors may break down at a lower voltage (due to the thin gate oxide) than other structures that use thicker field oxide for the dielectric. Break down voltage may limit the maximum voltage that the charge pump can generate.

In an alternative embodiment, the capacitor 110 and the capacitor 120 are implemented using different structures. In one embodiment, the node 103 and the node 104 are formed on one polysilicon layer and the node 105 and the node 106 are formed on another polysilicon layer that is separated from the first polysilicon layer by a dielectric layer. In an alternative embodiment, the node 103 and the node 104 are formed on one metal layer and the node 105 and the node 106 are formed on another metal layer that is separated from the first metal layer by a dielectric layer. These two types of capacitor structures generally have much greater breakdown voltages than a capacitor formed using a transistor. Other structures may be used.

In an alternate embodiment, the n-well 134 is coupled to the drain 132 and the n-well 144 is coupled to the drain 142.

Figure 2:
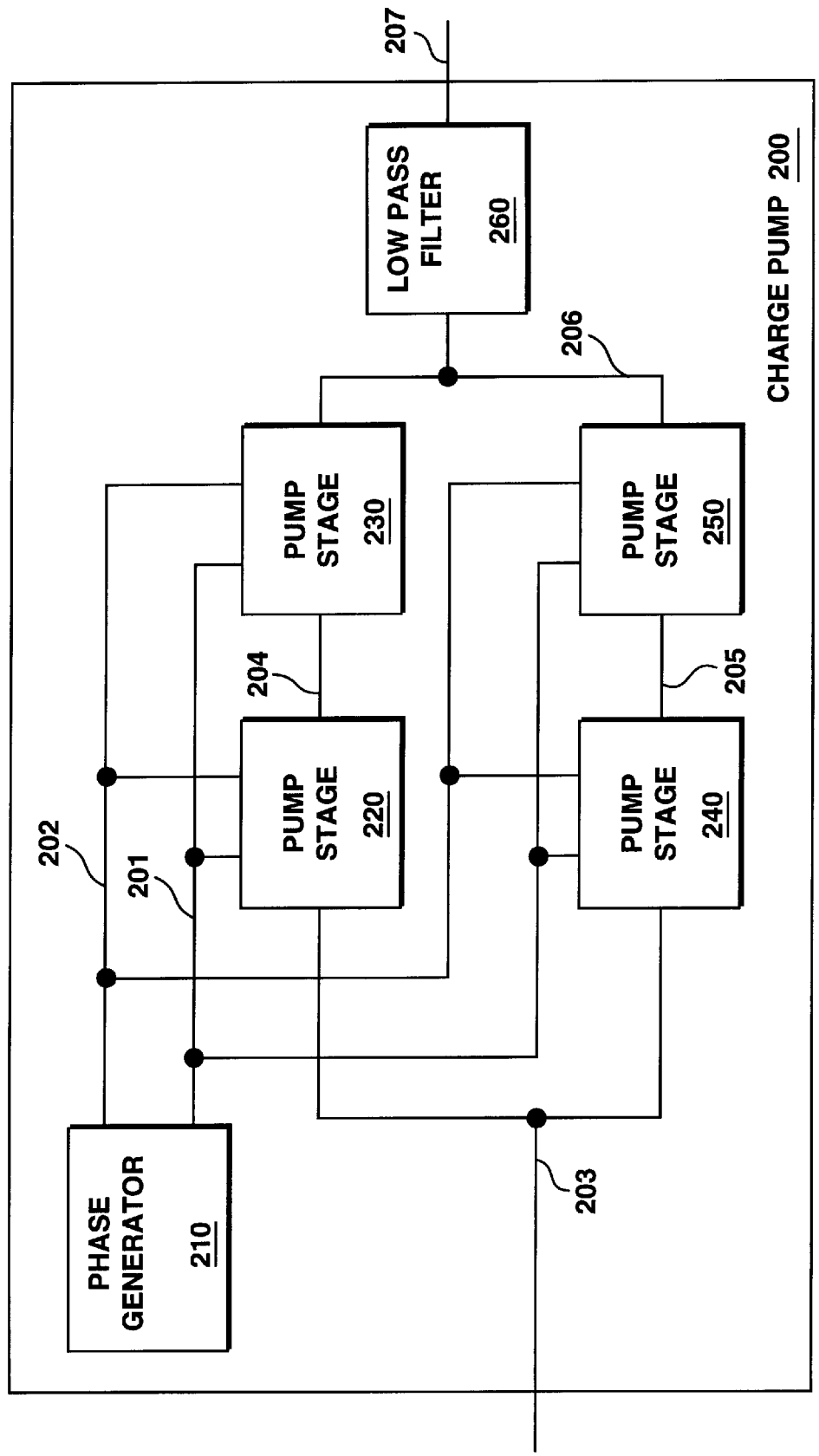
FIG. 2 illustrates one embodiment of a charge pump employing one or more instances of the pump stage 100 of FIG. 1.

FIG. 2 illustrates one embodiment of a charge pump employing one or more instances of the pump stage 100 of FIG. 1.

A phase generator 210 is used to generate the first phase signal on a bus 201 and a second phase signal on a bus 202. In one embodiment, the phase generator 210 receives a single clock phase and generates the first phase signal and a second phase signal. In another embodiment, the phase generator 210 receives two clock phases and generates the first phase signal and a second phase signal.

The charge pump 200 includes a pump stage 220, a pump stage 230, a pump stage 240, and a pump stage 250. In one embodiment, the pump stage 220, the pump stage 230, the pump stage 240, and the pump stage 250 are implemented as described above.

The pump stage 220 is coupled to the bus 201 and the bus 202 to receive the first and second phase signals, and the bus 203 to receive a first voltage, and the bus 204 to generate a second voltage. The second voltage is higher than the first voltage. The pump stage 230 is coupled to the bus 201 and the bus 202 to receive the first and second phase signals, and the bus 204 to receive the second voltage, and a bus 206 to generate a third voltage. The third voltage is higher than the second voltage.

The pump stage 240 is coupled to the bus 201 and the bus 202 to receive the first and second phase signals, and the bus 203 to receive a first voltage, and the bus 205 to generate the second voltage. The pump stage 250 is coupled to the bus 201 and the bus 202 to receive the first and second phase signals, and the bus 205 to receive the second voltage, and the bus 206 to generate the third voltage.

A low pass filter 260 is coupled to receive the third voltage on the bus 206 and generate a filtered third voltage on a bus 207. In one embodiment, the low pass filter 260 is a p-type transistor coupled in a diode arrangement. The source of the p-type transistor is coupled to receive the third voltage and the gate and the drain of the p-type transistor is coupled to the drain of the p-type transistor to generate the filtered third voltage on the drain of the p-type transistor. Other low pass filters may be used.

Other arrangements of pump stages may be used. In one embodiment, more pump stages are coupled in series to scale the output voltage up. In addition, more series of pump stages may be coupled in parallel to increase the power supplied by the charge pump and reduce the time for the charge pump to settle at its steady-state voltage.

In the following two examples showing approximate performance characteristics of two embodiments of a charge pump of the present invention, a load having a resistance of 100 kilohms and a capacitance of 5 picofarads, and a low voltage power supply of 2 volts is assumed.

In the pump stage of FIG. 1, the average gain of each of the two pump elements is approximately 0.72 volts. The steady-state output voltage of the pump stage is 3.4 volts and the output current is 0.034 milliamps. The time for the charge pump to settle at its steady-state voltage is 1209 nanoseconds. The steady-state output voltage of three, four and five pump elements in series is 4.8 volts, 5.5 volts, and 6.2 volts, respectively.

In charge pump of FIG. 2, the steady-state output voltage is 3.6 volts and the output current is 0.037 milliamps. The time for the charge pump to settle at its steady-state voltage is 604 nanoseconds.

What is claimed is:

1. An apparatus comprising:
a first stage having a first input and a first output, the first stage comprising:
a first capacitor having a fist node and a second node, the second node coupled to receive a first signal wherein the first capacitor comprises a third transistor having a third gate, a third source, a third drain, and a third n-well, the third source, the third drain, the third n-well and the first node being coupled together, the second node being coupled to the third gate;
a first p-type transistor having a first gate, a first source, a first drain, and a first n-well, the first gate being coupled to the first node and the first drain, the first source being coupled to the first input, the first n-well being floated;
a second capacitor having a third node and a fourth node, the fourth node coupled to receive a second signal; and
a second p-type transistor having a second gate, a second source, a second drain, and a second n-well, the second gate being coupled to the third node and the second drain, the second source being coupled to the first drain, the second drain being coupled to the first output, the second n-well being coupled to the second drain or being floated.

2. An apparatus comprising:

a first stage having a first input and a first output, the first stage comprising:

a first capacitor having a first node and a second node, the second node coupled to receive a first signal;

a first p-type transistor having a first gate, a first source, a first drain, and a first n-well, the first gate being coupled to the first node and the first drain, the first source being coupled to the first input, the first n-well being floated;

a second capacitor having a third node and a fourth node, the fourth node coupled to receive a second signal; and a second p-type transistor having a second gate, a second source, a second drain, and a second n-well, the second gate being coupled to the third node and the second drain, the second source being coupled to the first drain, the second drain being coupled to the first output, the second n-well being coupled to the second drain or being floated;

wherein at least one of the first capacitor and the second capacitor comprises a first metal node coupled to one of the first node and the third node; a second metal node coupled to a corresponding one of the second node and the fourth node; wherein the first metal node and the second metal node are separated by a dielectric layer.

3. An apparatus comprising:

a first stage having a first input and a first output, the first stage comprising:

a first capacitor having a first node and a second node, the second node coupled to receive a first signal;

a first p-type transistor having a first gate, a first source, a first drain, and a first n-well, the first gate being coupled to the first node and the first drain, the first source being coupled to the first input, the first n-well being floated;

a second capacitor having a third node and a fourth node, the fourth node coupled to receive a second signal; and a second p-type transistor having a second gate, a second source, a second drain, and a second n-well, the second gate being coupled to the third node and the second drain, the second source being coupled to the first drain, the second drain being coupled to the first output, the second n-well being coupled to the second drain or being floated;

wherein at least one of the first capacitor and the second capacitor comprises a first polysilicon node coupled to one of the first node and the third node; a second polysilicon node coupled to a corresponding one of the second node and the fourth node; wherein the first polysilicon node and the second polysilicon node are separated by a dielectric layer.

4. An apparatus comprising:

a first stage having a first input and a first output, the first stage comprising:

a first capacitor having a first node and a second node, the second node coupled to receive a first signal;

a first p-type transistor having a first gate, a first source, a first drain, and a first n-well, the first gate being coupled to the first node and the first drain, the first source being coupled to the first input, wherein the first n-well is floated;

a second capacitor having a third node and a fourth node, the fourth node coupled to receive a second signal; and a second p-type transistor having a second gate, a second source, a second drain, and a second n-well, the second gate being coupled to the third node and the second drain, the second source being coupled to the first drain, the second drain being coupled to the first output, the second n-well being coupled to the second drain or being floated.

5. The apparatus of claim 4, wherein the second n-well is floated.

6. An apparatus comprising:

a first stage having a first input and a first output, the first stage comprising:

a first capacitor having a first node and a second node, the second node coupled to receive a first signal;

a first p-type transistor having a first gate, a first source, a first drain, and a first n-well, the first gate being coupled to the first node and the first drain, the first source being coupled to the first input, the first n-well being floated;

a second capacitor having a third node and a fourth node, the fourth node coupled to receive a second signal;

a second p-type transistor having a second gate, a second source, a second drain, and a second n-well, the second gate being coupled to the third node and the second drain, the second source being coupled to the first drain, the second drain being coupled to the first output, the second n-well being coupled to the second drain or being floated;

a third capacitor having a fifth node and a sixth node, the sixth node coupled to receive the first signal;

a third p-type transistor having a third gate, a third source, a third drain, and a third n-well, the third gate being coupled to the fifth node and the third drain, the third source being coupled to the first input;

a fourth capacitor having a seventh node and an eighth node, the eighth node coupled to receive the second signal; and a fourth p-type transistor having a fourth gate, a fourth source, a fourth drain, and a fourth n-well, the fourth gate being coupled to the seventh node and the fourth drain, the fourth source being coupled to the third drain, the fourth drain being coupled to the first output.

7. An apparatus comprising:

a first stage having a first input and a first output, the first stage comprising:

a first capacitor having a first node and a second node, the second node coupled to receive a first signal;

a first p-type transistor having a first gate, a first source, a first drain, and a first n-well, the first gate being coupled to the first node and the first drain, the first source being coupled to the first input, the first n-well being floated;

a second capacitor having a third node and a fourth node, the fourth node coupled to receive a second signal;

a second p-type transistor having a second gate, a second source, a second drain, and a second n-well, the second gate being coupled to the third node and the second drain, the second source being coupled to the first drain, the second drain being coupled to the first output, the second n-well being coupled to the second drain or being floated; and a low pass filter coupled to receive the first output and generate a second output.

\* \* \* \* \*